United States Patent Office 3,382,703
Patented May 14, 1968

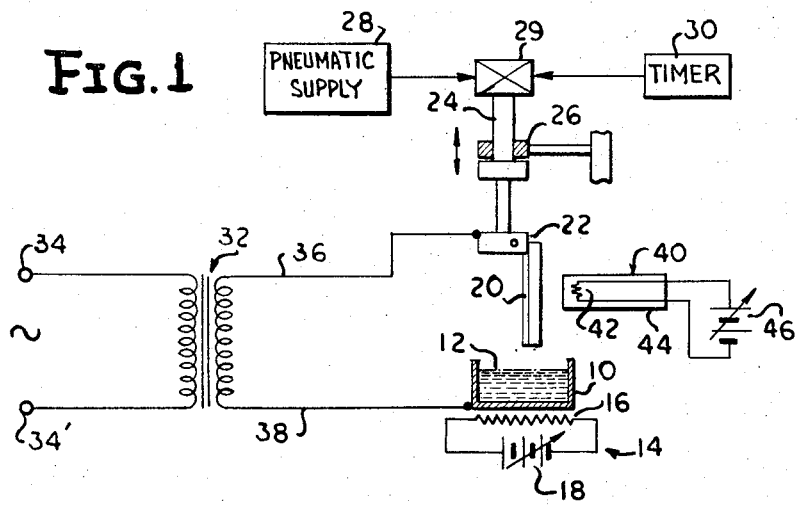
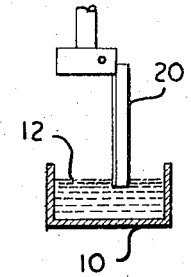
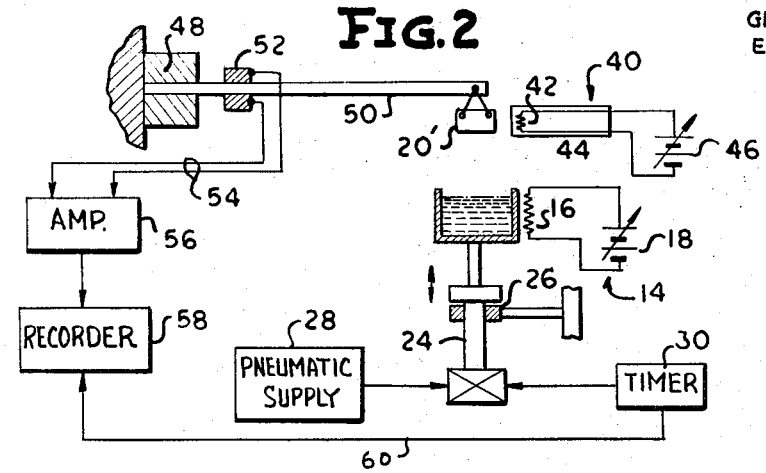
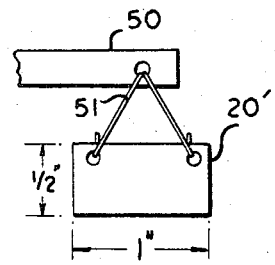
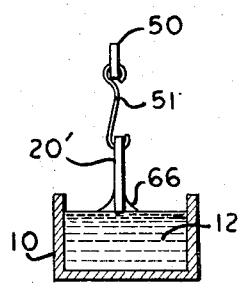

3,382,703
SOLDERING EVALUATION BY CAPILLARY
RISE AND APPARATUS THEREFOR
James Babakitis, Palos Heights, Ill., assignor to Continental Can Company, Inc., New York, N.Y., a corporation of New York
Filed Dec. 18, 1964, Ser. No. 419,455
20 Claims. (Cl. 73—15)

ABSTRACT OF THE DISCLOSURE

Disclosed herein are methods and apparatus for analyzing soldering systems. A molten solder bath is employed and a test specimen or blank is contacted with the molten solder bath to allow a capillary rise of solder along the test specimen or blank. The test specimen or blank is heated such that a full capillary rise of solder may be employed without the hardening thereof prior to such full capillary rise.

The apparatus employed in utilizing the above abstracted method includes apparatus for contacting the specimen with the solder bath and for heating the specimen prior to and during the period of contact with such bath. Pneumatic apparatus may be employed for contacting the specimen with the bath and a timer may be employed to limit the period of such contact. Test apparatus may be employed to determine and record the amount of solder deposited on the test specimen through the capillary rise of the molten solder.

This invention relates to methods and apparatus for analyzing the performance of soldering systems and more specifically to means for permitting the evaluation of fluxes, plate solderability and solder composition by the utilization of a capillary rise device. In addition, the rate of rise of the solder in the capillary test specimen may be determined and recorded.

A soldering system comprises the metal to be soldered, the solder, and the flux used to promote the fusion of the metal to be soldered. A number of variables are the temperature of the solder, the temperature of the metal to be soldered, the time it takes for the solder to wet the metal, and the capillary attraction between the fluxed metal and solder. In addition, other variables are present such as different types of fluxes, solders of differing compositions, and different metals which are capable of being soldered.

If any soldering system is to be operated most economically and efficiently, then the optimum performance can only be attained by utilizing the most beneficial temperature of the solder, type of flux, temperature of the metal to be soldered, etc. for the particular soldering job to be performed. In the soldering of metal container bodies at high speed, the side seam of the container body is usually preheated in some manner before the solder is applied. Thus, the amount of preheating is an important consideration when evaluating the efficiency of a metal container body soldering system. If truly high speed, economical and efficient operation is to be attained in systems such as that set forth, then a means must be provided for accurately and efficiently establishing the operating parameters to achieve such operation.

A high speed soldering system could be evaluated by a "hit or miss" technique, i.e., the metal containers could be soldered and the various parameters adjusted in order to try to arrive at some optimum conditions. However, this procedure could very well take several days. In addition, the system makes no provision for changes in metal to be soldered since the change of the metal would introduce an entirely new parameter and thus necessitate changes in the remaining parameters which, as previously set forth, involve temperatures, types of fluxes and solder, a determination of the capillary attraction between the fluxed metal and the solder, etc.

In one embodiment of the invention, a metal test specimen of a design permitting the capillary rise of the solder within the test specimen is employed. The prior art practices of evaluating soldering systems generally ignored the importance of the temperature of the test specimen and the temperature of the metal to be soldered. The evaluation of soldering systems by the use of a capillary rise test specimen are known; however, the invention here employs the heating of the test specimen prior to or during the evaluation of the soldering system. The capillary rise in the heated test specimen will be much greater and produce greater accuracy subject to analysis than the test specimen produced by the test sample being not heated or only heated by the transfer of heat from the heated liquid solder. The capillary rise in the heated test specimen will be much greater since the solder will be maintained molten throughout its entire length to the top of its rise or greatest height. The solder in a heated test specimen may rise as high as six inches whereas in the unheated test specimen the capillary rise of the solder may be only a fraction of an inch since the solder would solidify in the capillary gap before it attained its maximum possible rise. This solidification of the solder in the capillary gap of the unheated test specimen prevented accurate determinations such as those now attainable with the new heated test specimen as taught by the present invention. A true capillary rise was not obtainable in the unheated test specimen due to the temperature gradient across the length of the test specimen. Any change in height of the capillary rise as brought on by varying the temperatures, materials, etc., represented a greater percentage of the total height of the solder when the inaccurate and unheated test specimen was employed as opposed to the utilization of the heated test specimen which produced a truer and more exacting physical picture of the capillary rise in the test specimen.

After test specimens are produced, the walls of hte individual specimens are separated and through measurement and observation, the capillary solder in the test specimens can be determined. After a number of test specimens have been produced as a result of various temperatures, metals, fluxes, solders, etc., then the capillary rise of the solder in each of the test specimens can be compared. The capillary rise gives a measure of the efficiency and desirability of a soldered joint under the parameters contributing to the production of that specific test specimen. In actual practice, it is desirable that the solder spread over and wet the metal without any appreciable lapse of time. By accurate control of time, temperature, materials, the lowest temperature at which various solders and fluxes would instantaneously wet the metal under consideration, could be determined.

Accordingly, it is the principal object of the present invention to improve the accuracy of solder evaluation systems.

It is a further object of the present invention to provide a more accurate basis on which to evaluate solder systems.

It is a further object of the present invention to provide a test specimen produced under a controlled environment for evaluating solder systems.

It is a further object of the present invention to provide a test specimen produced under a controlled environment which yields an accurate picture of the affinity of the metal for the solder.

It is a further object of the present invention to provide a test specimen showing the capillary rise produced at a temperature commensurate with the solder.

It is a further object of the present invention to provide a test specimen which is heated during the capillary rise of the solder so as to yield a truer picture of the rise under controlled conditions.

It is a further object of the present invention to provide a test specimen which is heated before and during the capillary rise of the solder so as to yield an accurate picture of the rise under controlled conditions.

It is a further object of the present invention to provide a test specimen which is heated before contact with the solder and which is supported by a cantilever beam whose displacement is determined as the solder rises on the test specimen.

It is a still further object of the present invention to provide a record of time versus rise on a test specimen which is heated before and during contact with the solder and which is supported by a cantilever beam whose displacement is determined as a function of time as the solder rises on the test specimen.

In accordance with one embodiment of this invention, a solder container such as the commonly known solder pot, is maintained at a predetermined temperature by any convenient means used for the heating of solder pots of this type. Within the solder pot is contained the solder of the desired composition. The solder pot, and consequently the conductive molten solder, is coupled to one side of the secondary of a low voltage transformer. Supported directly above the solder pot, is a test specimen which is connected to a lowering means such as an electromagnetically operated cylinder. The test specimen is lowered into the molten solder under control of a timer which is coupled to actuate the air cylinder. The other side of the secondary of the low voltage transformer is coupled to the supporting means for the test specimen. Accordingly, as the test specimen engages the molten solder, the secondary circuit of the transformer is now closed so that the high current delivered by the secondary of the transformer flows through the test specimen thus causing heating of the test specimen. In addition, some heat may be transferred from the molten solder to the test specimen. If it is desired that the test specimen be heated prior to immersion in the solder, a heater is positioned juxtaposed the specimen for heating the specimen by infrared radiation, or the like. Thus, the solder is permitted to rise by capillary action to its maximum value in the test specimen since the heating of the specimen is to a temperature in excess of the soldification point of the solder. The test specimen now including the solder which has risen within the specimen through capillary action, may be removed and examined.

In a second embodiment of the invention, a means is provided for producing a time versus capillary rise record. A flat plate type test specimen is supported at the end of a cantilever beam and heated by a source such as infrared radiation. Immediately below the test specimen is positioned a heated solder pot. After the test specimen has been heated to the desired temperature, means, such as pneumatic means, may be employed to elevate the solder pot to a position where the lower end of the test specimen comes in contact with the free surface of molten solder. The molten solder then begins to rise on the test specimen and since the test specimen has been preheated, the rise of the solder on the specimen is not inhibited due to cooling and solidification of the solder. A timer may be coupled to the solder pot elevation means for permitting contact of the test specimen with the molten solder for a predetermined interval of time. Strain gauges affixed to the cantilever beam will produce electrical output signals in proportion to the deflection of the beam. As the solder rises on the test specimen by capillary action, the cantilever beam will be depressed due to the increased weight added by the solder and supported by the cantilever beam. The movement of the beam causes the strain gauges to produce electrical signals which are amplified and directed to a recorder. The timer which governs the interval of time that the test specimen is in engagement with the molten solder, is also coupled to the recorder for synchronization purposes. In other words, the recorder may be actuated at the same time that the solder pot is raised to engage the test specimen and may be inhibited upon the timer signaling the elevation means for the solder pot that the interval of time has expired and the solder pot is lowered out of engagement with the test specimen. During this interval of time, the strain gauges would be supplying signals to the amplifier which are, in turn, coupled to produce a type of permanent record of capillary rise versus time by the recorder. A correlation of the strain gauge output signals as a function of the capillary rise may be conveniently determined as is well known in the art.

The invention both as to its organizations and methods of operation together with further objects and advantages thereof will best be understood by reference to the following specification taken in conjunction with the accompanying drawings in which:

FIGURE 1 is an elevational view, partly in section, illustrating a folded test specimen supported above the solder container and the electrical wiring for heating the test specimen during its engagement with the molten solder;

FIGURE 2 is another embodiment, an elevational view partly in section, of the form of the invention wherein a flat plate test specimen is supported by a cantilever beam whose displacement due to the capillarity of the solder on the test specimen is detected by strain gauges, amplified and a permanent record made of the displacement versus time;

FIGURE 3 is an elevational view, partly in section, illustrating the folded test specimen of FIGURE 1 being supported above and having an end immersed in the molten solder;

FIGURE 4 is a perspective view of the folded test specimen of FIGURES 1 and 3 and illustrates in dotted outline, a solder boundary within the specimen after completion of a test run;

FIGURE 5 is an elevational view of the flat plate test specimen of FIGURE 2; and FIGURE 6 is a view, similar to FIGURE 3, but showing the flat plate test specimen of the FIGURE 2 in contact with the molten solder and the solder rising on the test specimen.

With reference to the FIGURE 1, a solder container or pot 10 is supported by any suitable means and contains the solder 12. The solder 12 in the solder pot 10 is maintained in its molten state at the desired temperature by solder heating means 14. The solder heating means 14 includes, for example, a resistive element 16 and a source of variable potential 18. By varying the potential 18 applied to the resistive element 16, various temperatures of the solder 12 may be maintained. It will be readily understood that in place of the variable potential 18, a constant potential may be applied to a variable resistive element for permitting different temperatures of the solder pot 10 and the solder 12.

In the FIGURE 1, a folded test specimen 20 is supported by a suitable clamping means 22 to an air cylinder 24 which is suitably supported by restraining means 26. A pneumatic supply 28 is coupled to a valve 29 which is in engagement with the air cylinder 24. The application of air from the pneumatic supply 28 to the valve 29, causes the air cylinder 24 to be driven downwardly a distance to permit the lower end of the test specimen 20 to engage the molten solder 12. The operation of the pneumatic supply 28 and the valve 29 is under control of a timer 30. After determining the length of time that the test specimen 20 is to be immersed in the molten solder 12, the timer 30 would be set to this value. Whereupon, the timer 30 would actuate the valve 29 to cause the pneumatic supply 28 to drive the air cylinder 24 downwardly and by convenient stops, the test specimen 20 would be caused to engage its lower tip or end and be immersed in the molten solder 12 in the solder pot 10. At the expiration of the time interval set into the timer 30, the timer 30 would cause the pneumatic supply 28 through the valve 29 to raise the air cylinder 24, thus removing the test specimen 20 from the molten solder 12.

With continued reference to the FIGURE 1, the test specimen 20 may be heated during immersion in the molten solder 12 and/or prior to immersion by other heating means. More specifically, a low voltage transformer 32 has its primary windings connected to a suitable alternating source at the taps 34 and 34'. The construction of the transformer is such that the transformer 32 supplies upon its secondary conductors 36 and 38 a low voltage, high current supply. The conductor 36 from one side of the secondary winding of the transformer 32 is coupled to the clamping means 22 which is in electrical engagement with the test specimen 20. Therefore, the test specimen 20 forms a portion of the secondary winding electrical circuit. In addition, it will be noted that the conductor 38 from the other side of the secondary winding is connected to the solder pot 10. Therefore, the solder 12, being a good electrical conductor, within the solder pot 10 forms the other side of the electrical circuit of the secondary winding of the transformer 32. Whenever the test specimen 20 is lowered into the solder 12, a current flows through the test specimen 20 which specimen 20 acts as a resistive element and is heated to a temperature in conformance with the current that is passed through the specimen 20.

In addition to the heating caused by the transformer 32 during immersion of the test specimen 20 into the molten solder 12, auxiliary heating means 40 are positioned adjacent the test specimen 20 while the specimen 20 is out of engagement with the molten solder 12 so as to permit a preheating of the test specimen 20 before immersion if such is desired. The auxiliary heating means 40 may take the form of any well-known means as infrared, and may comprise a resistive element 42 within a suitable housing 44 to which is connected a source of variable potential 46. By varying the potential 46 applied to the resistive element 42, various temperatures of the test specimen 20 may be maintained. It will be readily understood that a constant potential source may be substituted for the variable source 46 with the substitution of a variable resistive element for the fixed resistive element 42. In that suggested arrangement, the varying of the resistance in the circuit by the variable resistive element, will produce a gradation of temperatures, as desired.

In the FIGURE 2, similar reference numerals are used to identify like parts as those in the FIGURE 1. Accordingly, the solder pot 10 containing the solder 12 is heated by the solder heating means 14 including the resistive element 16 and the variable potential source 18. Whereas the test specimen 20 of the FIGURE 1 is movable relative to the solder pot 10, the solder pot 10 of the FIGURE 2 is movable with respect to the flat plate test specimen 20', at least during the initial steps of the test procedure. The solder pot 10 of the FIGURE 2 may be moved upwardly by any suitable means such as a laboratory jack or by the pneumatic arrangement, as shown, which is similar to the arrangement of the FIGURE 1. The solder pot 10 is supported by an air cylinder 24 which is confined to a predetermined path by the restraining means 26. A valve 20 to which is supplied air via the pneumatic supply 28 is secured to the air cylinder 24. A timer 30 drives the solder pot 10 up and down by controlling the pneumatic supply 28 and the valve 29.

Prior to contact of the test specimen 20' with the molten solder 12, the specimen 20' may be heated by the heating source 40, similar to the source 40 of the FIGURE 1, which includes the resistive heating element 42, the housing 44, and the variable source of potential 46. By proper selection of voltage and/or resistance, the desired temperature of the test specimen 20' may be maintained prior to and during the test run.

A clamp 48 supports a cantilever beam 50 in the manner shown and at the free end of the cantilever beam 50, a test specimen 20' is supported by a bifurcated hook 51 whose position is immediately above the solder pot 10. A strain gauge 52 is positioned about the cantilever beam 50 for signalling an amplifier 56 via a pair of conductors 54 any displacements of the beam 50 from its normal position. The output from the amplifier 56 is directed to a recorder 58 for producing a visible record of the output of the strain gauge 52 which is interpreted as displacement of the cantilever beam 50, and which in turn may be interpreted as the quantity of solder caused to rise through capillary action on the test specimen 20' when the specimen 20' comes in contact with the free surface of the molten solder 12. The timer 30, in addition to controlling the contact interval of the test specimen 20, has a conductor 60 coupled to the recorder 58 to provide synchronism of the recorder 58. In other words, the recorder 58 would be actuated only during the time that the test specimen 20' is actually in contact with the solder 12.

The FIGURE 3 illustrates the position of the folded test specimen 20 relative to the free surface of the molten solder 12 contained in the solder pot 10. It is preferably immersed approximately ½ inch in the solder. The flat plate test specimen 20' on the other hand initially just contacts the solder surface and is then drawn down slightly into the solder due to the deflection of the cantilever beam 50.

It will be understood that a number of test specimens 20 or 20' will be produced according to the demands of the particular test run. For example, a number of test specimens 20 may be produced, each at a different temperature of the solder 12. In addition, a number of test runs may be produced wherein a different test specimen 20' is used for different exposure times of the heat energy on the test specimen 20' causing heating to different temperatures.

The FIGURE 4 illustrates a test specimen 20 which may be used with the invention as set forth in the FIGURES 1 and 3 for accurately determining the capillary rise of the solder in the test specimen. The test specimen 20 may be approximately six inches long as shown and one-half inch wide, with a gripping edge 62 along one edge throughout its length. The test specimen 20 is made from a single rectangular piece of metal and folded back upon itself but exposing the gripping edge 62.

The sample specimen as shown in the FIGURE 4, illustrates the height to which the solder may rise in the test specimen 20. This height is illustrated by the dotted line 64 and after the test specimen 20 is cooled, the specimen is opened and the height and quality of the capillary rise is determined by visual inspection, or by other means.

The FIGURE 5 illustrates the preferred dimensions of the flat plate test specimen 20' which is made from a single rectangular piece of thin metal approximately one inch long and one-half inch in height. The molten solder is drawn up on the flat plate by capillary attraction in the form of a meniscus, the rise being limited due to the absence of a capillary gap as compared with the rise of the solder in the capillary gap in the specimen 20'. With reference to the FIGURE 6, the solder 66 is shown as it rises on the test specimen 20' utilized in the invention and practiced by the embodiment of the FIGURE 2.

In the manner as practiced in the prior art, a test specimen similar to the test specimen 20 of two or three inches in height was sufficient since the solder cooled and solidified during its rise in the test specimen limiting the rise to only a fraction of an inch. This was due to the loss of heat through non-heating of the test specimen during the test run. It is intuitively clear, that erroneous results were obtained concerning the height of the capillary rise since a true picture was not produced as practiced by the prior art.

The operation of the device as shown in the FIGURE 1 will now be detailed. A test specimen 20 is secured to the clamping means 22. The solder heating means 14 is activated to bring the solder 12 to the desired temperature. In the event that preheating of the test specimen 20 is desired, operation of the auxiliary heating means 40 would be initiated. In addition, the desired voltage would be supplied to the terminals 34 and 34′ fo rsupplying the heat current via the conductors 36 and 38 during the actual test run. After the interval of time of the test run is determined, this value is set into the timer 30. As soon as quiescent conditions are established, actuation of the start button (not shown) on the timer 30 would permit the valve 29 to supply air via the pneumatic supply 28 to the air cylinder 24 thus causing the air cylinder 24 carrying the test specimen 20 downwardly until the test specimen 20 is immersed in the solder 12 as shown in the FIGURE 3 to a depth of about one-half inch. Current now flows through the secondary winding of the transformer 32 to cause heating of the test specimen 20 and thus permit the solder to rise by capillary action to its true value within the test specimen 20. No cooling or solidification of the solder 12 is encountered in the test specimen 20 during the test run. At the expiration of the immersion interval, the timer 30 will so indicate and cause the pneumatic supply 28 to cease supplying air to the air cylinder 24 via the valve 29, thus causing the air cylinder 24 to be retracted and bring the test specimen 20 out of engagement with the solder 12. In the event that the auxiliary heating means 40 was employed, this heating means is extinguished to permit cooling of the test specimen 20. The cooled test specimen would then be removed and examined.

The operation of the apparatus of the FIGURE 2 is similar in certain aspects to that of the FIGURE 1. Here, it is necessary to actuate the auxiliary heating means 40 since no provision is made for heating the test specimen 20′ by electrical current as in the FIGURE 1. After the desired temperature of the test specimen 20′ has been reached through the cooperation of the heating means 40, and the solder 12 has assumed its desired temperature, then the depression of a start button (not shown) on the timer 30 would cause the pneumatic supply 28 to supply air to the valve 29, thus raising the solder pot 10 through the air cylinder 24 a distance to just make contact between the test specimen 20′ and the solder 12. (See FIGURE 6.) The signal from the timer 30 would also actuate the recorder 58. Immediately, the solder 12 would commence to rise via capillary action on the specimen 20 in the form of a meniscus 66 and cause the end of the cantilever beam 50 supporting the test specimen 20′ to be moved downwardly. The departure of the cantilever beam 50 from its normal position, would cause the strain gauge 52 to produce an output signal via the conductors 54 to the amplifier 56. The output from the amplifier 56 is coupled to the recorder 58 and through the connection of the timer 30, the recorder 58 is caused to produce a strain gauge 52 voltage versus time plot. The strain gauge 52 voltage can be readily interpreted as the quantity of solder rising on the test specimen 20′, by previously measuring the amount of solder on the test specimen 20′ for various voltages from the strain gauge 52. During contact of the test specimen 20′ with the molten solder 12, the heating means 40 supplies sufficient heat to the test specimen 20′ to prevent the solder rising on the test specimen 20′ from cooling and solidifying, which would produce erroneous results. After expiration of the interval of time as predetermined and set into the timer 30, the timer 30 would withdraw the solder pot 10 and inhibit the recorder 58.

Thus, there has been described means for analyzing the performance of soldering systems which produces an accurate picture of the capillary rise of the solder in and on a test specimen. By varying the dicerent parameters, the efficiency of the soldering system may be determined by analyzing the time it takes for the solder to wet the metal, the capillary attraction between the fluxed metal and the solder, the optimum temperatures of the metal to be soldered and the solder, and the capillary rise per unit of time of the solder in or on the test specimen. The affinity of the solder for the metal to be soldered is thus observed by an inspection of the test specimen at the conclusion of a test run.

Prior practices of evaluating soldering systems, generally ignored the importance of the temperature of the blank or test specimen or of the metal to be soldered, in actual practice. Accordingly, the amount of preheat which is applied to a rapidly advancing container body, is an important consideration when evaluating the efficiency of the container body system. In evaluating the soldering system, a plurality of test specimens of predetermined dimensions are constructed and utilized in the evaluation apparatus to accurately determine the optimum parameters to carefully control conditions during the test procedures. In tests as conducted by the prior art, the test specimen was not heated during the test run, and thus the solder cooled and solidified and failed to yield a true picture of the capability of the capillary rise in the test specimen. As practiced by the present invention, the test specimen is heated during the test run (and preheated before the test run if such is desired) so that now when the test specimen contacts or is immersed in the molten solder, the molten solder is free to rise to a height commensurate with those conditions, without being inhibited through cooling and solidification of the solder.

Thus, the present invention may be embodied in other specific forms without departure from the spirit and the essential characteristics of the invention. The present embodiments are, therefore, to be considered in all respects as illustrative and the scope of the invention being indicated by the appended claims rather than the foregoing description, and all changes which come within the meaning and range of the equivalency of the claims, are, therefore, intended to be embraced therein.

What is claimed is:

1. Apparatus for producing a solder carrying test specimen for use in evaluation of a soldering system comprising a bath of molten solder, means for preheating a test blank means for contacting said test blank with said bath, and means for heating the blank during contact with said bath.

2. Apparatus for producing a solder carrying test specimen for use in evaluation of a soldering system comprising a bath of molten solder, means for preheating a test blank means for immersing said test blank in said bath, and a transformer coupled to the test blank and said bath of molten solder for heating the test blank during immersion.

3. Apparatus for producing a solder carrying test specimen and for evaluating a soldering system comprising a bath of molten solder, pneumatic means for contacting a test blank with said bath, and timing means coupled to said pneumatic means for controlling said pneumatic means and for maintaining the test blank in contact with said solder bath for a predetermined period of time sufficient to allow full capillary rise of molten solder along the test blank.

4. The combination according to claim 3, wherein said pneumatic means comprises a pneumatic valve for raising said bath to cause the test blank to contact the free surface of the solder in said bath, and said combination further comprising beam means for supporting said test blank and at least one strain gauge connected to said beam means for determining the quantity of solder deposited on said test blank by generating an output signal indicative of the deflection of said beam means resultant from the depositing of solder on said test blank.

5. Apparatus for evaluating solder systems comprising a test blank of a configuration to permit capillary rise of solder, a bath of molten solder, means for immersing said test blank in said bath, and means for heating said test blank during immersion in said bath.

6. The combination as defined in claim 5, including beam support means for supporting said test blank and means for measuring the deflection in said beam resultant from the capillary rise of solder on said test blank.

7. The combination as defined in claim 6 wherein said means for measuring deflection in said beam comprising at least one strain gauge, said combination further comprising means for recording the output signals from said strain gauge.

8. The combination as defined in claim 7 including means for synchronizing the operation of said recorder and said means for contacting said test blank with said bath.

9. The combination according to claim 5, including timing means connected to said means for immersing for controlling the duration of time during which said test blank is immersed in said bath.

10. Apparatus for evaluating soldering systems comprising a test blank having a configuration for permitting capillary rise of solder within said test blank, a bath of molten solder, means for immersing said test blank in said bath, and a transformer coupled to the test blank and said bath of molten solder for heating said test blank during immersion in said bath.

11. The method for producing a solder carrying test specimen for soldering system evaluation comprising the steps of heating a bath of solder, preheating a test blank contacting the test blank with the bath to permit the solder to rise on the blank by capillary action, and heating the blank while in contact with the bath by other than conduction from the bath and removing the test blank from contact with the bath.

12. The method for producing a test specimen for soldering system evaluation comprising the steps of heating a bath of solder, supporting a test blank above the solder bath, preheating the test blank to a predetermined temperature, immersing the test blank in the bath to permit the solder to rise in the blank by capillary action, and heating the blank while immersed in the bath by passing an electric current through the test blank.

13. The method for producing a test specimen for soldering system evaluation comprising the steps of heating a bath of solder, providing a test blank of a configuration to permit capillary rise of solder, supporting the test blank above the bath of solder, immersing the test blank in the bath to permit the solder to rise along the blank by capillary action, heating the blank while immersed in the path by other than conduction from the bath, and withdrawing the test blank from the bath after expiration of a predetermined time interval.

14. Apparatus for evaluating a soldering system comprising a solder bath, means for heating said bath, a cantilever beam for supporting a test blank above said bath, means for preheating the test blank while supported by said beam, means for making contact between the test blank and the free surface of the solder in said bath, and means for determining the quantity of solder deposited on the test blank by measuring the deflection of the beam.

15. Apparatus for evaluating a soldering system comprising a solder bath, means for heating said bath, a cantilever beam for supporting a test blank above said bath, means for preheating the test blank while supported by said beam, means for contacting the test blank with the free surface of the solder in said bath, means for determining the quantity of solder deposited on the test blank by generating an output signal indicative of the deflection of the beam from its undeflected position, a recorder coupled to said means for determining or recording the signal indicative of the deflection of the beam, and means coupled to said recorder and said means for immersing, for, respectively, activating said recorder and limiting the interval within which the test blank is in contact with said bath.

16. Apparatus for evaluating soldering systems comprising a test blank permitting capillary rise of solder thereon, a solder bath, means for heating said bath, a cantilever beam for supporting said test blank above said bath, means for preheating said test blank while supported by said beam, means for contacting said test blank with the free surface of the solder in said bath, and means for determining the quantity of solder deposited on said test blank by measuring the deflection of the beam.

17. The method of soldering system evaluation comprising the steps of heating a bath of solder, supporting a test blank above the bath, heating the test blank to a predetermined temperature before contacting it with the bath, contacting the test blank with the bath of solder, and measuring the quantity of solder deposited on the test blank per unit of time.

18. The method of soldering system evaluation comprising the steps of heating a bath of solder, supporting a test blank on a cantilever beam above the bath, heating the test blank to a predetermined temperature before contacting it with the bath, contacting the test blank with the bath to permit the solder to rise on the blank by capillary action, and measuring the quantity of solder deposited on the test blank by determining the deflection of the cantilever beam.

19. The method as defined in claim 18 including the step of recording the deflection of the cantilever beam.

20. The method as defined in claim 19 including the step of actuating the recording during the immersion period only.

References Cited

UNITED STATES PATENTS

| | | | |
|---|---|---|---|
| 2,535,855 | 12/1950 | Kuvek | 73—17 |
| 2,597,751 | 5/1952 | Ruge | 201—63 |
| 3,048,999 | 8/1962 | Pochan | 73—54 |

FOREIGN PATENTS

| | | |
|---|---|---|
| 830,413 | 5/1965 | England. |

JAMES J. GILL, *Primary Examiner.*

EDDIE E. SCOTT, *Assistant Examiner.*